(12) United States Patent
Li et al.

(10) Patent No.: US 9,760,714 B2
(45) Date of Patent: *Sep. 12, 2017

(54) METHOD, APPARATUS AND SYSTEM FOR PROCESSING COMPUTER VIRUS

(71) Applicant: BEIJING QIHOO TECHNOLOGY COMPANY LIMITED, Beijing (CN)

(72) Inventors: Bo Li, Beijing (CN); Guiqiang Zou, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,991

(22) Filed: Mar. 17, 2017

(65) Prior Publication Data

US 2017/0193227 A1    Jul. 6, 2017

Related U.S. Application Data

(63) Continuation of application No. 14/123,737, filed as application No. PCT/CN2012/076395 on Jun. 1, 2012, now Pat. No. 9,626,510.

(30) Foreign Application Priority Data

Jun. 3, 2011    (CN) .......................... 2011 1 0149163

(51) Int. Cl.
G06F 21/56    (2013.01)

(52) U.S. Cl.
CPC .......... *G06F 21/561* (2013.01); *G06F 21/564* (2013.01); *G06F 21/565* (2013.01); *G06F 2221/034* (2013.01)

(58) Field of Classification Search
CPC ....... G06F 21/568; G06F 21/56; G06F 21/562
See application file for complete search history.

(56) References Cited

U.S. PATENT DOCUMENTS

| 7,103,913 | B2 | 9/2006 | Arnold et al. |
| 2003/0212906 | A1 | 11/2003 | Arnold et al. |
| 2006/0101282 | A1 | 5/2006 | Costea et al. |
| 2008/0047013 | A1 | 2/2008 | Claudatos et al. |
| 2011/0023118 | A1 | 1/2011 | Wright |
| 2013/0333042 | A1 | 12/2013 | Saika |

FOREIGN PATENT DOCUMENTS

| CN | 1766845 A | 5/2006 |
| CN | 1983294 A | 6/2007 |
| CN | 102194072 A | 9/2011 |

OTHER PUBLICATIONS

International Application No. PCT/CN2012/076395; Int'l Search Report; dated Sep. 6, 2012; 2 pages.

*Primary Examiner* — Amir Mehrmanesh
(74) *Attorney, Agent, or Firm* — Baker & Hostetler LLP

(57) ABSTRACT

A method, an apparatus and a system for processing a computer virus. The method comprises: obtaining a correspondence between a file type of a first file infected with a computer virus and process information of a first process used by the computer virus to access the first file; and refusing access to a second file by a second process based at least in part on the correspondence, wherein a file type of the second file matches the file type of the correspondence, and process information of the second process matches the process information of the correspondence.

13 Claims, 3 Drawing Sheets

METHOD, APPARATUS AND SYSTEM FOR PROCESSING COMPUTER VIRUS

CROSS-REFERENCE TO RELATED APPLICATIONS

This application is a continuation of application Ser. No. 14/123,737, filed on Dec. 3, 2013, which is the National Stage of International Application No. PCT/CN2012/076395 filed Jun. 1, 2012, which claims the benefit of Chinese Patent Application No. 201110149163.2, filed Jun. 3, 2011, the disclosures of which are incorporated herein by reference in their entireties.

TECHNICAL FIELD

The present invention relates to a computer technology field, and in particular, to a method, an apparatus and a system for processing a computer virus.

BACKGROUND OF THE INVENTION

A computer virus is data which is programmed or inserted into a computer program to destroy a computer function. Also, the computer virus formed as a set of computer instructions or program codes can influence the normal use of a computer and be self-duplicated. The computer virus has features of destructibility, replicability and infectivity. When a file in a computer system is infected with a virus, the system is required to be scanned by an antivirus software to sweep the virus away. Since the transmissibility of the computer virus is strong, a run virus may attempt to infect other files in the system, thereby making it difficult to completely kill the virus in the system by the antivirus software.

In the prior art, when the antivirus software are scanning the computer virus, a rewritten file in the system can be obtained by a file system filter driver supported by a Windows system. Since the running of the antivirus software is based on the support of an antivirus engine, feature codes of various computer viruses are included in the antivirus engine. The feature codes are compared with the rewritten file. If the rewritten file includes the feature codes, it will be indicated that the rewritten file comprises the computer virus. Accordingly, virus codes in the file will be cleaned, or the whole file which is infected with a virus will be deleted. It has been found that, when the inventor researched the processing of the computer virus in the prior art, since the infectivity of current computer viruses is strong, files in which the virus have been cleaned during the scanning process of the antivirus software may be infected with a virus again very shortly. Therefore, it is difficult to effectively prevent the propagation of the virus in the system in the prior art, and the safety performance of the system is decreased.

SUMMARY OF THE INVENTION

The object of the embodiments of the present application is to provide method, an apparatus and a system for processing a computer virus, in order to solve the problems in the prior art in which it is difficult to effectively prevent the propagation of the computer virus thereby decreasing the safety of the system.

To solve above technical problems, the embodiments of the present application provide technical solutions as follows:

A method for processing a computer virus, comprising: obtaining a correspondence between a file type of a first file infected with a computer virus and process information of a first process used by the computer virus to access the first file; and refusing access to a second file by a second process based at least in part on the correspondence, wherein a file type of the second file matches the file type of the correspondence, and process information of the second process matches the process information of the correspondence.

An apparatus for processing a computer virus, comprising:

at least a processor; and at least a memory communicatively coupled to the at least a processor, the at least a memory bearing processor-executable instructions that upon execution by the at least a processor cause the apparatus at least to:

obtain a correspondence between a file type of a first file infected with a computer virus and process information of a first process used by the computer virus to access the first file; and refuse access to a second file by a second process based at least in part on the correspondence, wherein a file type of the second file matches the file type of the correspondence, and process information of the second process matches the process information of the correspondence.

A computing system comprising a first antivirus engine device, the first antivirus engine device is configured to at least:

obtain a correspondence between a file type of a first file infected with a computer virus and process information of a first process used by the computer virus to access the first file; and refuse access to a second file by a second process based at least in part on the correspondence, wherein a file type of the second file matches the file type of the correspondence, and process information of the second process matches the process information of the correspondence.

It can be seen from the technical solution discussed in above embodiments of the application, these embodiments of the application obtain a correspondence between a file type of a first file infected with a computer virus and process information of a first process used by the computer virus to access the first file, and refuse the process corresponding to the correspondence between the file type of the first file and the process information of the first process. When the embodiments of the application are used to process computer viruses, since all the files whose type is the same as files to which a process infecting with the virus are refused to be accessed by the process, the propagation of the viruses may be prevented, rather than only cleaning the files infected with viruses. As a result, it may be possible to effectively prevent the propagation of the viruses in the system and protect other files from being infected with these viruses again, thereby increasing the safety performance of the system.

BRIEF DESCRIPTION OF THE DRAWINGS

For the purpose of more clear description of the technical solution of the embodiments of the present application or the prior art, a brief explanation to figures which are used to describe the embodiments or the prior art will be provided below. It is obvious to the ordinary skilled in the art that other figures can be obtained based on these figures without paying creative work.

DETAILED DESCRIPTION OF THE EMBODIMENTS

A method, an apparatus and a system for processing a computer virus are provided respectively in embodiments of the present application hereafter.

In order to make those skilled in the art could understand the technical solution of the embodiments of the present application better and make the above objects, features and advantages of the embodiments of the present application more apparent, the technical solution of the embodiments of the present application will be further described in detail with reference to the accompanying drawings.

Figure 1:
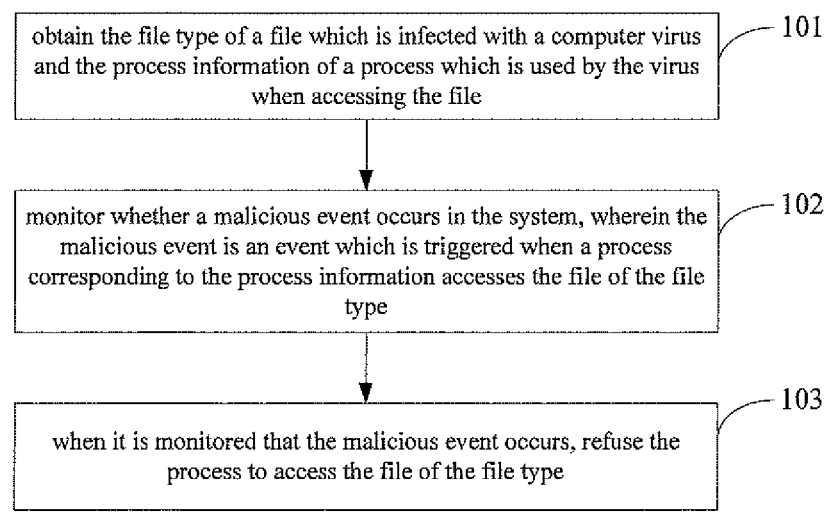
FIG. 1 is a flow chart showing a first embodiment of a method for processing a computer virus in the present application.

Referring to FIG. 1, it is shown a flow chart of the first embodiment of a method for processing a computer virus in the present application.

Step 101: obtain the file type of a file which is infected with a computer virus and the process information of a process which is used by the virus when accessing the file.

In particular, the file type of the file which is infected with the computer virus may be extracted from the scanning result of scanning files in the system, the process ID of the process used by the computer virus when accessing the file is recorded by a file filter driver in the system, and a correspondence between the file type and the process ID is saved.

Step 102: monitor whether a malicious event occurs in the system, wherein the malicious event is an event which is triggered when a process corresponding to the process information accesses the file of the file type.

In particular, when it is monitored that the process in the system accesses the file, the process ID of the process and the file type of the file is obtained; the correspondence may be searched according to the process ID of the process and the file type of the file; and when a record in conformity to the process ID of the process and the file type of the file is found in the correspondence, the occurrence of the malicious event may be determined.

Step 103: when it is monitored that the malicious event occurs, refuse the process to access the file of the file type.

In particular, an instruction for refusing to access the file of the file type is returned to the process by the file filter driver.

Further, files in the system may be scanned first so as to obtain the scanning result in which the files infected with viruses in the system are recorded, and then the computer viruses may be cleaned according to the scanning result.

It will be understood from the above embodiment, when processing the computer viruses, since all the files whose type is the same as files to which a process infecting with virus are refused be accessed by the process, the propagation of the viruses may be prevented, rather than only clearing the files infected with viruses. As a result, it may be possible to completely clean the viruses in the system and protect other files from being infected with these viruses again, thereby increasing the safety performance of the system.

Figure 2:
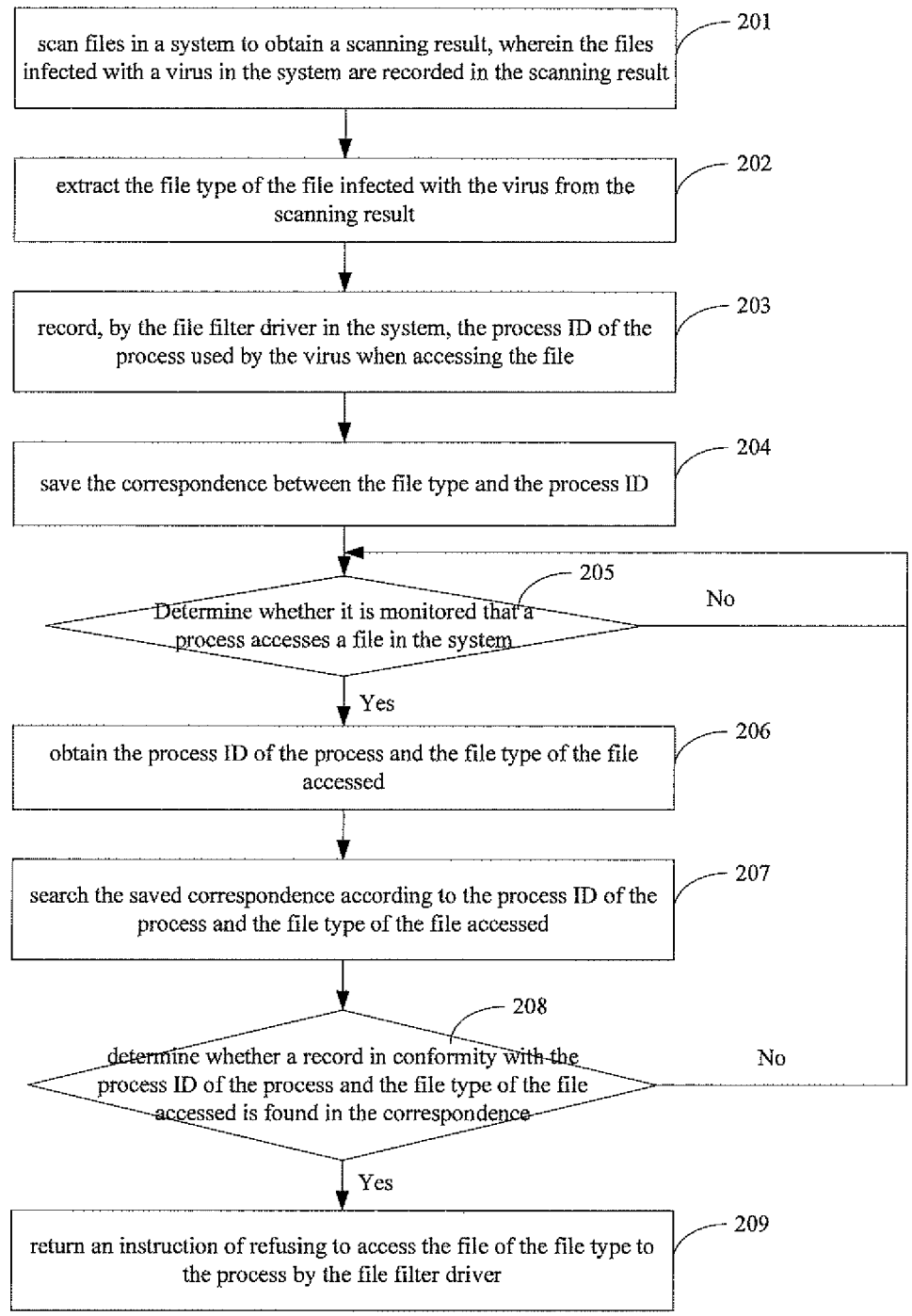
FIG. 2 is a flow chart showing a second embodiment of a method for processing a computer virus in the present application.

Referring to FIG. 2, it is shown a flow chart of the second embodiment of a method for processing a computer virus in the present application.

Step 201: scan files in a system to obtain a scanning result, wherein the files infected with a virus in the system are recorded in the scanning result.

An antivirus engine in the system may determine the file infected with the virus by scanning files in the system, wherein the antivirus engine may obtain, by the file filter driver, an event in which a file is rewritten, so as to determine the rewritten file in the system; the antivirus engine may extract a rewritten feature from the rewritten file, invoking virus feature prestored in a feature library, and compare between the two features. If the extracted feature matches the virus feature, it is indicated that the rewritten file has been infected with the virus. At this time, a virus clean manner may be employed to clear away the virus codes in the file in order to eliminate the influence of the virus on file, and then the file infected with the virus will be recorded in the scanning result.

Step 202: extract the file type of the file infected with the virus from the scanning result.

Usually, the file type of the file which is inclined to be infected with the virus includes EXE files, office documents, and web files and so on. The viruses in such above types of files may be cleaned in a similar manner. That is, based on the description to the virus codes in the feature library, the virus codes in the files infected with the virus will be deleted or shielded.

Step 203: record, by the file filter driver in the system, the process ID of the process used by the virus when accessing the file.

When a computer virus infects a file in the system, a virus code is usually placed into a position in the file where they can be executed surely, that is the file may be rewritten by the virus code. For example, the virus code is usually written into the default entry function of an EXE file, the macrocode of a office document or any position in a web file. The original function of the file infected with the virus usually is not influenced; it is difficult for a user to notice that the file has been rewritten. However, when the user opens the file, the virus code will run and propagate the virus to other files in the system and even to another system which is in connection with the present system via network.

When the virus code rewrites the file, it is required to access to the file via a corresponding process and the accessing of any processes in the system to the file may be detected by the file filter driver, that is, the file filter driver may obtain the process ID of the process accessing the file and the file path of accessing the file.

Step 204: save the correspondence between the file type and the process ID.

For example, if a certain virus rewrites a file C having a file type B by a process A, when the virus engine obtains that the file C has been infected with the virus according to the scanning result, it may be informed the type of the file C is B and it may also be informed that the process ID of the process is A by the file filter driver, whereby recording the correspondence between the process ID of "A" and the file type of "B".

Step 205: determine whether it is monitored that a process accesses a file in the system. If yes, continue to perform Step 206, or return to Step 205.

Step 206: obtain the process ID of the process and the file type of the file accessed.

Step 207: search the saved correspondence according to the process ID of the process and the file type of the file accessed.

Step 208: determine whether a record in conformity with the process ID of the process and the file type of the file accessed is found in the correspondence. If yes, continue to perform Step 209, or return to Step 205.

Step 209: return an instruction of refusing to access the file of the file type to the process by the file filter driver, and end the current procedure.

If it is monitored that a process A in the system is to access a file D and a file E, wherein the file type of the file D is B and the file type of the file E is F, then two sets of records is obtained, that is, the process A and the file type B corresponding to the file D, and the process A and the file type F corresponding to the file E. When the two sets of records is compared with the prestored correspondence, it may be determined that the first set of record matches with the prestored correspondence. Therefore, the process A is prevented from accessing the file D. In this case, the file filter driver sends an instruction of refusing to access the file D to the process A; meanwhile, the file filter driver sends an instruction of allowing to access file E to the process A.

In the above embodiment, when the process which rewrites a file is an ordinary process utilized by a virus, since only the correspondence between the process and the file type of the file rewritten by the virus is recorded, the function of accessing files of other types in the system is not influenced. Therefore, its function may be used normally while the propagation of the virus is inhibited. When the embodiment of the present application is utilized to process the computer virus, since all the files whose type is the same as files to which a process infecting with virus are refused to be accessed by the process, the propagation of the virus may be prevented, rather than only cleaning the files infected with the virus. As a result, it may be possible to completely clean viruses in the system and protect other files from being infected with these viruses again, thereby increasing the safety performance of the system.

It should be explained that, in the file system of the operating system, a file invoking chain (also referred to as a file invoking stack) generally may be designed as a hierarchical structure. There are a number of layers on the file invoking chain, each of which provides in interface for an upper layer and performs invoking on a lower layer. The invoking request for a file starts from the top layer, through layer-by-layer processing on the invoking chain and to a lower equipment of the file system, finally it is determined which sector of a disk the file is stored at and how many bytes of the file occupies, and then corresponding information is returned. For example, the following hierarchical invoking manner is utilized when executing the file invoking operation: a invoker (for example, a security software and so on) invokes a kernel interface layer, the kernel interface layer invokes the kernel execution layer, the kernel execution layer invokes a file object parsing routine, the file object parsing routine invokes the file filter driver, a top-layer file filter driver invokes layer by layer until a bottom-layer file filter driver is invoked, the bottom-layer file filter driver invokes the lower equipment of the file system, and so on. Herein, the file filter driver on the file invoking chain may be some programs installed by some applications to achieve their functions and run on the kernel layer of the operating system, and there may be a plurality of file filter drivers on the file invoking chain. The file filter driver mentioned in the embodiments of the present application belongs to this case. That is, a file filter driver may be installed by a security software product. As such, an access request may pass through the file filter driver during a process in the system accessing a file; meanwhile, the process information corresponding to the access request and the type information of the file accessed may be obtained, and their presence in the above prestored correspondence may be searched. Further, if it is required to refuse the current process to access the current file, the access request is not forwarded to a lower layer thereof. Its lower layer will not receive the access request and the process cannot access to the file naturally. Of course, an instruction of refusing to access the file may be sent to the refused process at the same time. If it is unnecessary to refuse the current process to access the current file, the access request is forwarded to a lower layer thereof continuously. Similarly, an instruction of allowing accessing the file may be sent to the process at the same time.

In addition, above embodiments of the method for processing the computer virus may also be applied to a system including a plurality of antivirus engines, in which, one of the antivirus engines in the system may utilize the aforesaid embodiments to obtain the file type of the file infected with the computer virus and the information of the process employed by the virus when accessing the file. The correspondence between the file type and the process information may be sent to other antivirus engines of antivirus engines in the system. The other antivirus engines of antivirus engines may save the correspondence between the file type and the process information. Once it is monitored that the malicious event occurs, the process may be refused to access a file of this file type according to the stored correspondence. It can be thus seen, in the case that the embodiments of the application are applied to the system including a plurality of antivirus engines, when one of the antivirus engines has obtained the correspondence between the file type and the process information corresponding to the malicious event, other antivirus engines having the same function may use the correspondence directly.

An apparatus for processing a computer virus is also provided by the present application, which corresponds to the embodiments of the method for processing the computer virus in the present application.

Figure 3:
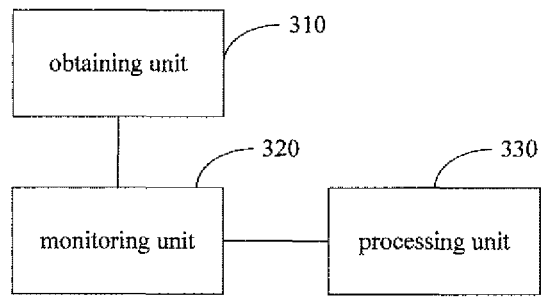
FIG. 3 is a block diagram showing a first embodiment of a device for processing a computer virus in the present application.

Referring to FIG. 3, it is shown a block diagram of a first embodiment of an apparatus for processing a computer virus in the present invention.

The apparatus includes an obtaining unit 310, a monitoring unit 320 and a processing unit 330.

The obtaining unit 310 is configured to obtain the file type of a file which is infected with a computer virus, and the process information of a process which is used by the virus when accessing the file.

The monitoring unit 320 is configured to monitor whether a malicious event occurs in a system, wherein the malicious event is an event which is triggered when a process corresponding to the process information accesses a file of the file type.

The processing unit 330 is configured to refuse the process to access the file of the file type when it is monitored that the malicious event occurs.

Figure 4:
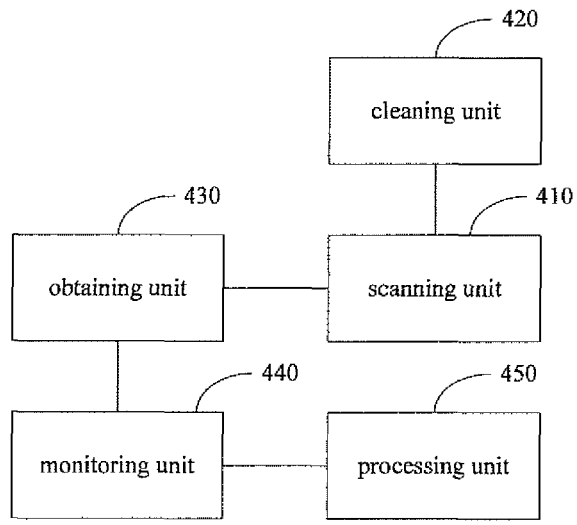
FIG. 4 is a block diagram showing a second embodiment of a device for processing a computer virus the present application.

Referring to FIG. 4, it is shown a block diagram of a second embodiment of an apparatus of processing a computer virus in the present application.

The apparatus includes a scanning unit 410, a cleaning unit 420, an obtaining unit 430, a monitoring unit 440 and a processing unit 450.

The scanning unit 410 is configured to scan files in the system to obtain a scanning result, wherein files infected with viruses in the system are recorded in the scanning result.

The clearing unit 420 is configured to clean the computer viruses recorded in the scanning result.

The obtaining unit 430 is configured to obtain the file type of the file which is infected with the computer virus and the process information of a process which is used by the virus when accessing to the file.

The monitoring unit 440 is configured to monitor whether the malicious event occurs in the system, wherein the malicious event is an event which is triggered when the process accesses a file of the file type.

The processing unit 450 is configured to refuse the process to access the file of the file type when it is monitored that the malicious event occurs.

In detail, the obtaining unit 430 may include (not shown in FIG. 4):
a file type extracting unit, configured to extract the file type of the file which is infected with the virus from the scanning result of scanning the files in the system;
a process ID recording unit, configured to record, by the file filter driver in the system, the process ID of the process used by the virus when accessing to the file; and
a correspondence saving unit, configured to save the correspondence between the file type and the process ID.

In detail, the monitoring unit 440 may include (not shown in FIG. 4):
a monitoring result obtaining unit, configured to obtain the process ID of the process and the file type of the file when it is monitored that the process accesses the file;
a correspondence searching unit, configured to perform searching in the correspondence according to the process ID of the process and the file type of the file; and
a malicious event determining unit, configured to determine that the malicious event occurs when a record in conformity to the process ID of the process and the file type of the file is found in the correspondence.

In detail, the processing unit 450 may be configured to return an instruction of refusing to access the file of the file type to the process by the file filter driver.

Figure 5:
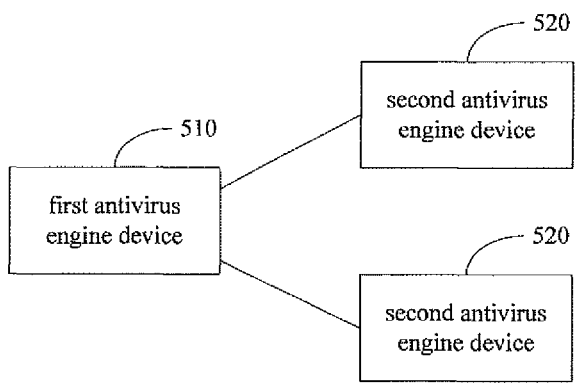
FIG. 5 is a block diagram showing an embodiment of a system for processing a computer virus in the present application.

Referring to FIG. 5, it is shown a block diagram of a system for processing a computer virus in the present application.

The system includes a first antivirus engine device and at least a second antivirus engine device. For the purpose of illustration, FIG. 5 shows a first antivirus engine device 510 and two second antivirus engine devices 520. In practice, however, it may include only one second antivirus engine device 520 or more than two second antivirus engine devices 520.

Herein, the first antivirus engine device 510 is configured to obtain the file type of a file which is infected with a computer virus and the process information of a process which is used by the virus when accessing the file, monitor whether a malicious event occurs in the system of the first antivirus engine device, wherein the malicious event is an event which is triggered when the process accesses a file of the file type, and refuse the process to access the file of the file type when it is monitored that the malicious event occurs.

Further, the first antivirus engine device 510 is also configured to send a correspondence between the file type and the process information to the multiple second antivirus engine devices 520.

The second antivirus engine devices 520 is configured to save the correspondence between the file type and the process information, and refuse the process to access the file of the file type according to the correspondence when it is monitored that the malicious event occurs.

It should be explained that the terms "first" and "second" used in the first antivirus engine device and the second antivirus engine device as described above is for the purpose of illustration, and the function of each antivirus engine device in the system are equal to each other. That is, in FIG. 5, any one of the second antivirus engine devices may have the function of the first antivirus engine device, and similarly, the first antivirus engine device may have the function of the second antivirus engine device.

It will be understood from the description of above embodiments, these embodiments of the application may obtain the file type of the file which is infected with the computer virus and the process information of a process which is employed by the virus when accessing the file, monitor whether the malicious event occurs in the system, and refuse the process corresponding to the process information to access the file of the file type when it is monitored that the malicious event occurs. When the embodiments of the application are used to process the computer virus, since all the files whose type is the same as files to which a process infecting with virus are refused to be accessed by the process, the propagation of the virus may be prevented, rather than only cleaning the files infected with the virus. As a result, it may be possible to effectively prevent the propagation of the viruses in the system and protect other files from being infected with these viruses again, thereby increasing the safety performance of the system.

Those skilled in the art may clearly appreciate that the technologies of the embodiments of the application may be accomplished by mean of a software in connection with a required universal hardware platform. According to this understanding, the essential part or the part contributing to the prior art of the technical solution of the embodiments of the application may be embodied as a form of software products. The computer software products may be stored in a storage medium such as ROM/RAM, disk and compact disc, and comprise a plurality of instructions which could be used to enable a computer system (that could be a personal computer, a server or a network equipment) to execute the method as described in various embodiments of the application or certain parts thereof.

Each of the embodiments in the description is explained step by step. Each of the embodiments has only emphasized the differences from others, and the same or similar explanations of each embodiment could be made reference to each other. Particularly, since the embodiment of the system is substantially similar to the embodiments of methods, the explanations thereof are relatively brief and could be seen also in those embodiments of corresponding methods.

The embodiments of the application as discussed above should not be constructed to limit the scope of the present application. Any modification, alternative or improvement made without departing from spirit and principle of the present application should be fallen into protection scope of the present application.

The invention claimed is:

1. A method for processing a computer virus, comprising:
   scanning files to obtain a scanning result, the scanning result recording files infected with computer viruses;
   extracting, from the scanning result, a file type of a first file infected with a computer virus;
   obtaining, from a file filter driver, process information of a first process used by the computer virus to access the first file;
   establishing a correspondence between the file type of the first file infected with the computer virus and the process information of the first process used by the computer virus to access the first file;
   obtaining the correspondence between the file type of the first file infected with the computer virus and the process information of the first process used by the computer virus to access the first file;
   obtaining process information of a second process and a file type of a second file;
   performing a search of the correspondence between the file type of the first file and the process information of the first process according to the process information of the second process and the file type of the second file; and
   refusing access to the second file by the second process when the process information of the second process and the file type of the second file are in conformity to the correspondence between the file type of the first file and the process information of the first process.

2. The method of claim 1, wherein the process information of the first process is a process ID of the first process and the process information of the second process is a process ID of the second process.

3. The method of claim 1, further comprising: cleaning the computer viruses recorded in the scanning result.

4. The method of claim 1, wherein the refusing access to the second file by the second process further comprises:
   returning, by a file filter driver, an instruction of refusing access to the second file by the second process.

5. The method of claim 1, wherein the method is applied to a computer system including a plurality of antivirus engines, and the method further comprising:
   sending, by a first antivirus engine among the plurality of antivirus engines, the correspondence between the file type and the process information to a second antivirus engine among the plurality of antivirus engines; and
   refusing, by the second antivirus engine, access to a third file by a third process based at least in part on the correspondence received by the second antivirus engine, wherein a file type of the third file matches the file type of the correspondence received by the second antivirus engine, and process information of the third process matches the process information of the correspondence received by the second antivirus engine.

6. An apparatus for processing a computer virus, comprising:
   at least a processor; and
   at least a memory communicatively coupled to the at least a processor, the at least a memory bearing processor-executable instructions that upon execution by the at least a processor cause the apparatus at least to:
   scan files to obtain a scanning result, the scanning result recording files infected with computer viruses;
   extract, from the scanning result, a file type of a first file infected with a computer virus;
   obtain, from a file filter driver, process information of a first process used by the computer virus to access the first file;
   establish a correspondence between the file type of the first file infected with the computer virus and the process information of the first process used by the computer virus to access the first file;
   obtain the correspondence between the file type of the first file infected with the computer virus and the process information of the first process used by the computer virus to access the first file;
   obtain process information of a second process and a file type of a second file;
   perform a search of the correspondence between the file type of the first file and the process information of the first process according to the process information of the second process and the file type of the second file; and
   refuse access to the second file by the second process when the process information of the second process and the file type of the second file are in conformity to the correspondence between the file type of the first file and the process information of the first process.

7. The apparatus of claim 6, wherein the process information of the first process is a process ID of the first process and the process information of the second process is a process ID of the second process.

8. The apparatus of claim 6, wherein the at least a memory further bears processor-executable instructions that upon execution by the at least a processor cause the apparatus at least to:
   clean the computer viruses recorded in the scanning result.

9. The apparatus of claim 6, wherein the processor-executable instructions that upon execution by the at least a processor cause the apparatus at least to refuse the second process to access the second file further cause the apparatus at least to:
   return, by a file filter driver, an instruction of refusing access to the second file by the second process.

10. The apparatus of claim 6, wherein the at least a memory further bears processor-executable instructions that upon execution by the at least a processor cause the apparatus at least to:
    send, by a first antivirus engine among a plurality of antivirus engines, the correspondence between the file type and the process information to a second antivirus engine among the plurality of antivirus engines; and
    refusing, by the second antivirus engine, access to a third file by a third process based at least in part on the correspondence received by the second antivirus engine, wherein a file type of the third file matches the file type of the correspondence received by the second antivirus engine, and process information of the third process matches the process information of the correspondence received by the second antivirus engine.

11. A computing system comprising a first antivirus engine device, the first antivirus engine device comprising:
    a processor;
    a memory communicatively coupled to the processor to configure the processor at least to:
    scan files to obtain a scanning result, the scanning result recording files infected with computer viruses;
    extract, from the scanning result, a file type of a first file infected with a computer virus;
    obtain, from a file filter driver, process information of a first process used by the computer virus to access the first file;

establish a correspondence between the file type of the first file infected with the computer virus and the process information of the first process used by the computer virus to access the first file;
obtain the correspondence between the file type of the first file infected with the computer virus and the process information of the first process used by the computer virus to access the first file;
obtain process information of a second process and a file type of a second file;
perform a search of the correspondence between the file type of the first file and the process information of the first process according to the process information of the second process and the file type of the second file; and
refuse access to the second file by the second process when the process information of the second process and the file type of the second file are in conformity to the correspondence between the file type of the first file and the process information of the first process.

12. The computing system of claim 11, further comprising at least a second antivirus engine device, wherein the first antivirus engine device is further configured to send the correspondence between the file type and the process information to the at least a second antivirus engine device.

13. The computing system of claim 12, wherein the at least a second antivirus engine device is configured to at least:
receive the correspondence between the file type and the process information; and
refuse access to a third file by a third process based at least in part on the correspondence received by the at least a second antivirus engine, wherein a file type of the third file matches the file type of the correspondence received by the at least a second antivirus engine, and process information of the third process matches the process information of the correspondence received by the at least a second antivirus engine.

* * * * *